United States Patent [19]

Holly

[11] 4,387,966
[45] Jun. 14, 1983

[54] WIDE BANDWIDTH OPTICAL MODAL DEFORMATION SENSOR

[75] Inventor: Sandor Holly, Woodland Hills, Calif.

[73] Assignee: Rockwell International Corporation, El Segundo, Calif.

[21] Appl. No.: 167,265

[22] Filed: Jul. 9, 1980

[51] Int. Cl.³ .............................................. G02F 1/29
[52] U.S. Cl. ..................................... 350/360; 350/358
[58] Field of Search ............................. 350/358, 360; 331/94.5 C

[56] References Cited

PUBLICATIONS

Hardy et al., Real–Time Atmospheric Compensation, JOSA vol. 67, No. 3 (Mar. 1977) pp. 360–369.

*Primary Examiner*—William L. Sikes
*Assistant Examiner*—Léon Scott, Jr.
*Attorney, Agent, or Firm*—H. Frederick Hamann; Harry B. Field

[57] ABSTRACT

Wave front deformations resulting, for example, from the interaction of a laser beam with a deformable mirror are measured by causing the beam, or a sampled portion thereof, to interfere with a reference beam having a slightly different frequency in order to produce interference patterns in a detection plane. Spaced-apart detectors in that plane brightness oscillation at the difference frequency; and relative phase differences in these oscillations are used to determine wave front tilt, spherical and astigmatic aberrations, and, possibly, other deformations. Control signals are provided for correcting these wave front deformations by controlling the surface contour of the deformable mirror. The measuring laser beam may intercept the mirror within and as part of a polarization-type interferometer, or the measuring beam may be derived from a high-energy beam. In the former case, the reference beam does not intercept the deformable mirror; in the latter case, the reference beam is also derived from the high-energy beam, but "cleaned" by spatial filtering.

2 Claims, 5 Drawing Figures

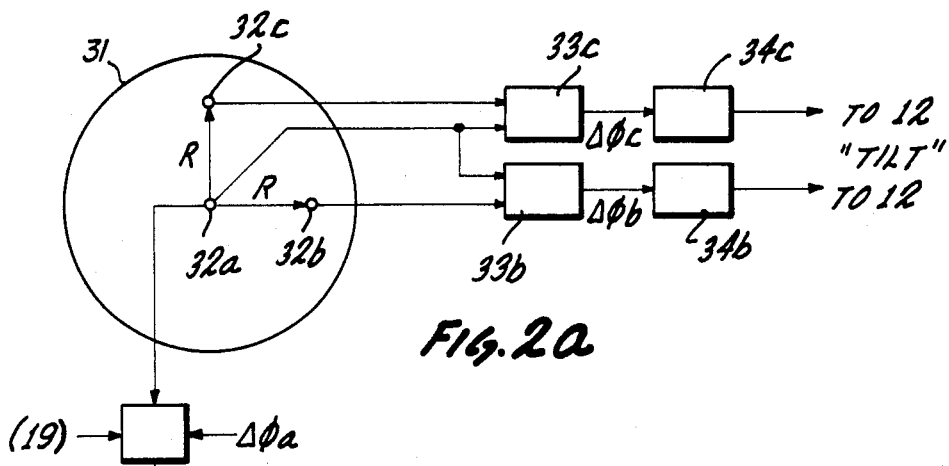
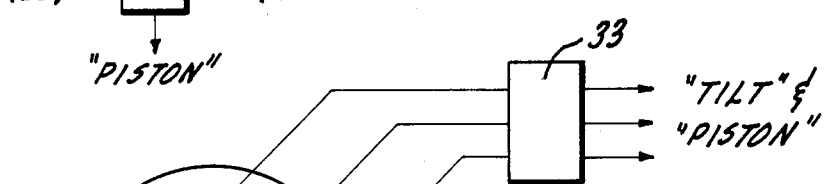
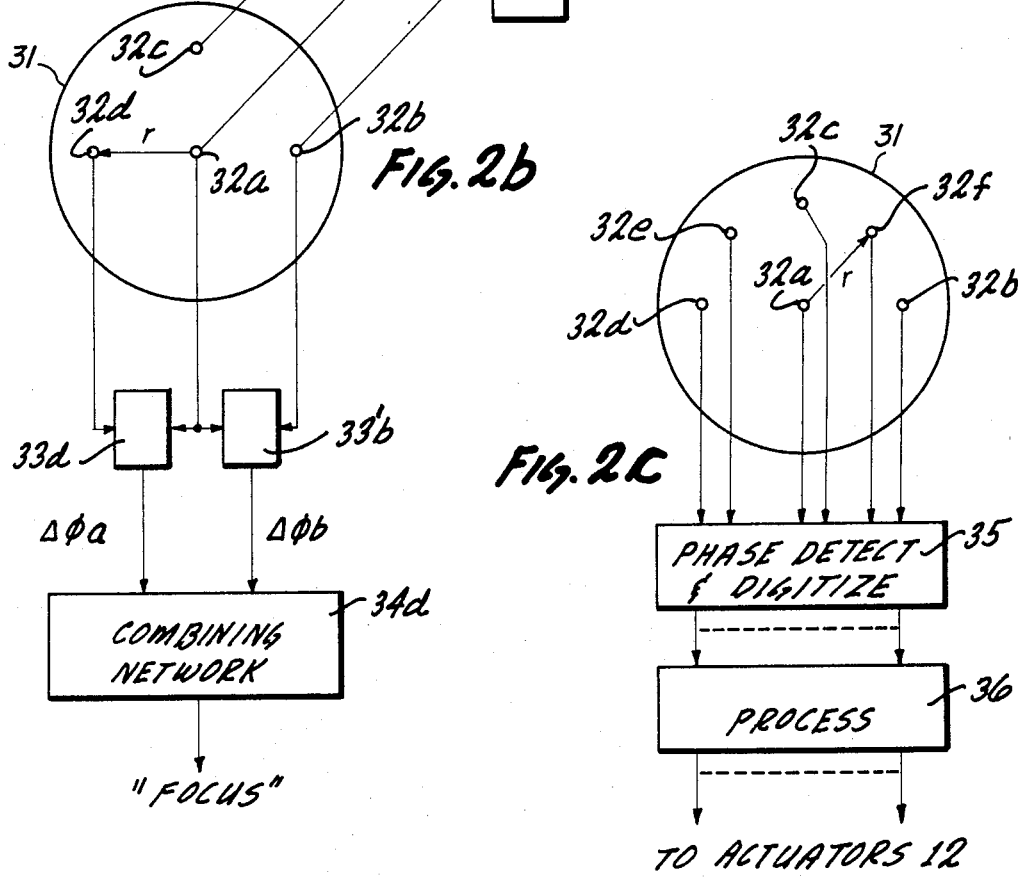

WIDE BANDWIDTH OPTICAL MODAL DEFORMATION SENSOR

BACKGROUND OF THE INVENTION

The present invention relates to a method and equipment for measuring the deformation of a reflector; and more generally, the invention relates to measuring deformation of wavefronts on an interferometric basis.

The deformation of an optical surface can be measured interferometrically, using, for example, an interferometer as disclosed in U.S. Pat. No. 4,188,122 by me and another. This device was designed primarily for purposes of enhancing optical phase and spatial resolution of the measurement. Thus, this device depends to a great extent upon the utilization of a large number of detect points. In fact, it is the advantage of that device that it permits utilization of many points of detection in order to increase resolution. Inherently, the device is relatively slow in the acquisition of data by means of acquisition cycles, each of which is comprised of a sequence of interrogating steps to cover all of the detect points. One could, of course, interrogate these points in parallel, but at a prohibitive expense in equipment. On the other hand, certain optical surfaces undergo contour changes which have a relative high bandwidth.

It is, therefore, an object of the present invention to provide a new and improved method and equipment for determining the contour of an optical surface at a high speed, when deformations are dominated by, or even restricted to, a few modes with the lowest spatial frequencies.

DESCRIPTION OF THE INVENTION

In accordance with the preferred embodiment of the present invention, it is suggested to provide a laser beam for interaction with an optical surface or an optical medium that may deform or distort the wave fronts of that beam. It is further suggested to provide a reference laser beam at a frequency slightly different from the frequency of the first-mentioned measuring beam and to cause these beams to interfere with each other, resulting in radiation intensity oscillations at the difference frequency, in a detection plane that intercepts the combined and interfering beams. These oscillations are detected in a plurality of but a few discrete, spaced apart detection points and are referenced against each other and/or a reference oscillation as to phase. The resulting phase differences represent optical path differences (OPD) that, in turn, can be related directly to two-dimensional wave front tilt, spherical distortion, astigmatism-like cylindrical distortions, coma, and others. By way of example, as few as four detectors can determine two-dimensional tilt and spherical distortion. At least six detectors are needed to includ sensing of cylindrical distortions in two directions. Broadly speaking, these distortions can be represented in terms of appropriately weighted Zernike polynomials. In other words, the dominant part of total wave front deformation, as it frequently occurs in practice, resides in the first few terms of a Zernike expansion describing the wave front contour geometrically. Deformations described by these terms are detected with a wide bandwidth in accordance with the invention; these detected signals may then be applied to appropriate (preferably matched) modal mirrors to remove the deformations which result in a significant improvement in the wave front characteristics of a beam. Such a modal mirror, which is matched to the present modal deformation sensors, needs relatively few actuators, acting upon the mirror surface to eliminate low-order but high-amplitude, possibly fast-moving distortions. Accordingly, the detector outputs are readily convertible into on-line, real-time actuator outputs in a corrective feedback configuration.

It should be noted that within the realm of the invention, a few detect points or a few actuators is to mean, a number of points or actuators in the order of $10^0$ to $10^1$. It is decisive that these actuators be interrogated in parallel so that wave front distortions of relative high frequency (in time) can be detected and eliminated by simultaneous, parallel action of each sensor-actuator channel. It should be noted further that any of these distortions, as described, can be detected without the use of an external reference signal. Rather, the detector outputs can be referenced to each other as to phase. However, a forward or backward shift of wave fronts as a whole (also called "piston") requires for detection an external reference signal. To state it differently: distortions, other than piston, can be detected and determined by using any of the detectors in the measuring plane as a reference; and by determining the phase of the oscillations as detected by other detectors in relation to that one reference detector.

The measuring beam and the reference beam must, of course, be derived from a common source. This beam may be originated by a low-power probe laser which measures, e.g., the surface characteristics of a modal mirror in the stated fashion. That mirror, in turn, may additionally be provided to reflect another laser beam, such as a high-energy beam; and the control of the mirror will beneficially affect the quality of the mirror (such as automatically removing the lowest-order components due to thermo-deformation, for example). Alternatively, measuring and reference beams may be derived from a high-energy laser beam, downstream from the intercepting modal mirror. The reference beam is "cleaned" in that all wave front distortions are eliminated as much as possible, e.g., by means of focusing and spatially filtering it.

DESCRIPTION OF THE DRAWINGS

While the specification concludes with claims, particularly pointing out and distinctly claiming the subject matter which is regarded as the invention, it is believed that the invention, the objects and features of the invention, and further objects, features and advantages thereof, will be better understood from the following description taken in connection with the accompanying drawings, in which:

FIG. 2a is a schematic view of a detail of the system shown in FIG. 1, showing a simple detection system for determining wave front tilt.

FIGS. 2b and 2c are similar views of detection systems, supplemented for detecting more details of wave front distortions.

Proceeding now to the detailed description of the drawings, FIG. 1 illustrates a deformable mirror 10 which is included in a high-energy laser system, or HEL system for short. That system emits an HEL-beam 11 which is reflected by mirror 10 into a desirable path, or for other purposes. The planarity of that mirror or reflector 10 is to be monitored. Moreover, reflector 10 may be constructed as a so-called modal mirror, mounted in its back to a plurality of actuators 12 which, upon being energized, change the related positions of portions of the mirror and deform its surface. The contour of the mirror or reflector 10 as a whole is the result of the state of energization of all of these actuators 12. These deformable mirrors 10 are known also as modal adaptive mirrors. The actuation includes shifting of the mirror as a whole in a direction perpendicular to its surface (piston movement); actuation includes also tilting of the mirror as a whole, without distortion, about two axes; for example, one extending transverse to the plane of the drawing, the other one parallel thereto. Differential actuation of particular actuators will warp or otherwise distort the mirror (or correct such distortion). Thus, the actuators may tilt the reflector back into a particular position and restore its planarity if it is warped or otherwise distorted.

Figure 1:
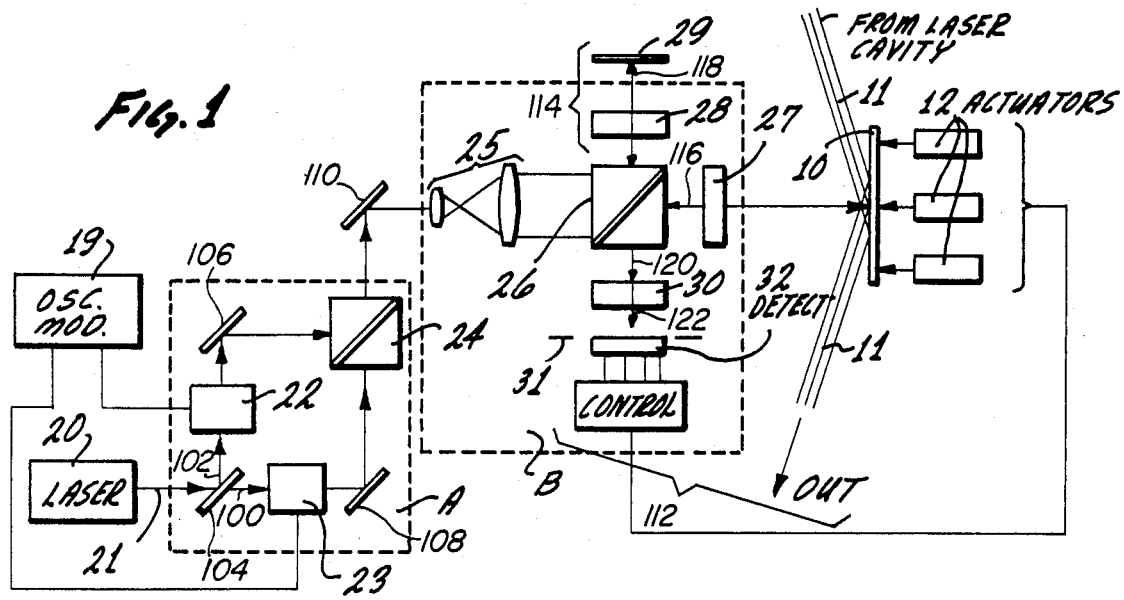
FIG. 1 is a block diagram for a detector and control system in which the preferred embodiment is practiced in accordance with the best mode thereof, showing particularly the control of the planarity of laser wave fronts.

The measuring system employed incorporates many components of the device described in U.S. Pat. No. 4,188,122, whose content is incorporated by reference. The measuring system includes a laser 20, emitting a beam 21, which is typically split into two differently polarized components—100 and 102—by means of a polarization cube —104—. The polarization of the two 100 and 102 beams are orthogonal; and at least one beam is frequency-shifted by a frequency, $\Delta f$ (typically $\Delta f$ is in the Radio Frequency range). It was found practical to frequency-shift both components by means of Bragg cells 22 and 23, but by different amounts, the difference being the desired modulation frequency, $\Delta f$. Reference numeral 19 denotes a source of modulation frequencies for driving the Bragg cells 22 and 23; the $\Delta f$ frequency may itself be derived from that source.

The two beams are redirected by mirrors 106 and 108 and recombined, by using a polarizing beam splitter cube 24. The subunit generating the two-component beam 100 and 102, in which the two components differ slightly in frequency and are orthogonally polarized, is designated by character A. This composite beam is fed either directly or by way of mirror means 110 to a polarization-sensitive interferometer B, which includes a test arm generally designated 112 and a reference arm generally designated 114. The beam is expanded by expander 25 and polarization split by splitter 26 into the two beams 116 and 118. The test arm 112 includes the mirror or reflector 10 as well as a $\lambda/4$ plate 27. The reference arm 114 includes also a $\lambda/4$ plate 28, and a reference mirror 29 being highly planar; its planarity or surface topology is maintained by appropriate means, such as mounting, temperature control, if necessary, and so forth.

Test 116 and reference 118 beams are individually returned and recombined in 26 and passes the resultant beam 120 through a depolarizer or polarization filter 30 so that components of equal polarization be extracted from each of the two beam components as recombined. Thus, downstream from filter 30 these extracted components will interfere and set up an interference pattern in any intercepting plane such as 31. The fringes of this interference pattern move at a rate that equals the difference frequency $\Delta f$ between the test 116 and reference 118 beams. Thus, one will be able to detect an oscillation in any point in plane 31 having that difference frequency $\Delta f$. This frequency will be the same in all such detect points, but their phases will, in general, differ in representation of optical path differences in and across the measuring beam 122.

FIG. 2a shows a first, rather simple, example for practicing the invention. An array 32 of the three detectors 32a, 32b, and 32c, is located in that plane 31. These detectors 32a,b,c are arranged in an L-shaped pattern, "corner" detector 32a being, for example, disposed in the center of the optical field, e.g., intercepting the optical axis of the interferometric system of FIG. 1 as traversing the detector plane 31.

The radiation that each detector 32a,b,c, receives oscillates with respect to its intensity at the frequency $\Delta f$. The phase of these oscillations in relation to each other represents optical path differences in and across the measuring beam 122. The phase of the first detector 32a, for example, represents the so-called piston of the wave fronts in relative terms; that is to say, variations in the piston value (i.e., variations in the phase of the radiation as detected by detector 32a) represent displacements of mirror 10 as a whole, along a direction perpendicular to its surface. However, it is necessary to define a position, and phase reference vis-à-vis "piston" is established.

The reference position of the mirror 10 is, of course, an arbitrary one; it is a particular position of the mirror which will result in a particular phase of the output of the center detector 32a relative to a reference signal of like frequency. For this, one may use directly the electrical oscillations $\Delta f$, as generated by unit 19. The phase $\Delta \phi_o$ may denote the output that detector 32a happens to have in relation to that reference oscillation for the zero or reference position of mirror 10. That phase value can be used as zero marker, or be offset in the phase detection process. The phase detector 32a in FIG. 2 thus produces a signal which directly represents relative piston movement. Its output, duly amplified, can be fed to the actuators 12 in order to offset that piston movement if desired.

The three interference radiation detectors 32a, 32b, and 32c can be deemed to be disposed in the corners of a right triangle. The relative phases of the outputs of the two detectors 32b and 32c in relation to the center detector 32a is indicative of the tilt of mirror 10, out of the desired position; or one can say that these three detectors furnish outputs which, in relation to each other, indicate the deviation of the normal on mirror 10 from the optical axis of the measuring beam. The two phase detectors 33b and 33c establish these tilt values in two orthogonal directions.

The output of phase detector 33b is the phase difference $\Delta \phi_b$ between the oscillations detected by detectors 32a and 32b, while the output detector 33c is the phase difference $\Delta \phi_c$ between the oscillations detected by detectors 32a and 32c. Let R be the (equal) distance of detectors 32b and 32c from detector 32a; any tilt can be expressed by the following two functions:

(b) $\tan^{-1}(\Delta \phi_b/R)$ and (c) $\tan^{-1}(\Delta \phi_c/R)$ wherein the first function represents the wave front tilt angle about an axis parallel to the line defined by the detectors 32a and 32c, while the second function represents the wave front tilt angle about an axis parallel to the line defined by the detectors 32a and 32b. Since only small angles are involved, the tangent's function of an angle can proportionally be approximated by the angle itself. Thus, the outputs of the detectors 33b and 33c represent the tilt angles. Amplifiers 34b and 34c may be provided with a slightly nonlinear characteristic to eliminate a higher-order difference between the tangent's function (being the phase detector outputs) and the angles represented therein.

The output signals of the amplifiers 34b and 34c can be directly fed to suitable actuators 12 of mirror 10 in order to correct the wave front tilt by an incremental, counter-acting mirror tilt.

It should be mentioned that, in the alternative, the reference input for detectors 33b and 33c could be connected to the external reference oscillation source in unit 19; and the outputs of all three detectors 33a, 33b, and 33c are then additionally combined to obtain the above-mentioned tilt functions. The external oscillation phase will in fact, be eliminated and the resulting output will be the same (except, possibly, for scaling) as outlined above.

The detector system, shown in FIG. 2b, includes one additional detector, 32d, by means of which a sperical or focal distortion component of the wave fronts of the measuring beam is detected. The circuit 33 in FIG. 2b includes the circuit shown in FIG. 2a; i.e., its outputs are the signals representing "piston" and "tilt." The fourth detector, 33d, is now connected to a phase detector 34d which generates the phase difference $\Delta\phi_d$. The detector 33'b can actually be identical with the detector 33b of FIG. 2; its output $\Delta\phi_b$ is simply shared by the circuits detecting "tilt" and "focus."

The two outputs of, respectively, detectors 33'b and 33d can be algebraically combined in a network 34d which generates a function representing the radius of curvature of the spherical component of the detected wave front distortion:

$$\tfrac{1}{4}(\Delta\phi_b + \Delta\phi_d) + \frac{R^2}{\Delta\phi_b + \Delta\phi_d} \tag{d}$$

A signal representing this function can be generated by simple summing circuits and a divider circuit. The result can also be applied to several of the actuators 12 in order to correct the spherical distortion of the wave fronts by spherically distorting mirror 10 in a counteracting manner.

From a practical point of view, the four radiation detectors 32a through 32d provide already the most important error information, tilt and spherical abberation, i.e. an average warping of mirror 10. The various phase detectors 32a,b,c, are connected to serve as parallel inputs to an arithmetic circuit which calculates the relevant values from these outputs.

A wave front can generally be represented in terms of a Zernike polynomial series.

$$\omega = aZ_1 + bZ_2 + cZ_3 + dZ_4 + \ldots$$

wherein $Z_1$, $Z_2$, and so forth, are the Zernike Polynomials. $Z_1 = 1$ and coefficient "a" defines the "piston" movement. $Z_2$ and $Z_3$ define tilt; and b and c are, respectively, the tilt-defining or weighting coefficients. On the basis of FIGS. 2a and 2b, one can readily see that one needs one detector to find "piston"; two detectors to find tilt about one particular axis; three detectors to find tilt about two axes; i.e., about any axis in a plane. The three weighting coefficients b and c above are given by (i.e., proportional to) the functions (b) and (c) supra. The weighting coefficient d is actually directly proportional to the curvature of a spherical deformation; i.e., it is inversely proportional to the function (d) above, that function representing the radius of such deformation.

The Zernike polynomials are, of course, $Z_1 = 1$, $Z_2 = 2 \, r \cos \zeta$, $Z_3 = 2 \, r \sin \zeta$, $Z_4 = \sqrt{3}\,(2\,r^2 - 1)$, etc., wherein angle $\zeta$ is measured against an axis running through the detectors 32a and 32b, as shown, and r is a radial coordinate of a cylindrical coordinate system $(r,\zeta)$ in the detector plane 31.

It should be noted, however, that these relations are given here to demonstrate the direct relation between the detected phase differences and Zernike Polynomials, which are customarily used to describe wave front distortions. The control signals generated in each instance do not, however, need to represent directly the weighting coefficient of the Zernike decomposition. The control signals are adapted to the particular mode of controlling the mirror's contour and orientation; and their amplitudes, polarity, band width, and so forth, are tailored to meet the requirements of the particular servocontrol loop that it is used in.

FIG. 2c shows another detection array in which two more detectors, 32e and 32f, have been added. Generally speaking, one needs five detectors to determine "piston," two-axis "tilt," "focus," and one-axis astigmatism; i.e., a cylindrical distortion in relation to one axis in the detection plane; and a sixth detector permits, in addition, detection of an orthogonal astigmatism or cylindrical distortion.

It is apparent that for these and still higher-order distortions, analogue signals may be cumbersome to generate; thus, the various phase detector outputs (all of them using conveniently the detector output of 32a as a reference) are connected to phase detector and digitizing circuits 35 in order to feed digital signals in multiplexed or parallel fashion into a digital arithmetic unit 36. The phase detection should be carried strictly in parallel by separate detectors, as described. The multiplexing of digital signals may be matched to the serial arithmetic processing in unit 36.

The unit 36 has as its primary function the formation of control signals which drive the actuators 12. These control signals will be developed after very few calculations by and in the processor. Thus, the control signals can be updated, for example, at tens of kilohertz rates, or faster, so that the bandwidth of response to change in the position and contour of mirror 10 is accordingly high. Particulars of these control signals depend upon the configuration, orientation, and disposition of actuators 12. It can readily be seen that the tilt coefficients b and c, as calculated, may merely be gated, amplified, and fed to particular ones of these actuators in order to tilt the mirror about the x-axis, the y-axis, or both, as the case may require. The coefficient d (spherical distortion) simply requires energization of an actuator in the center of the mirror while holding peripheral ones (or vice versa). The control operation envisioned here is in some instances directed toward obtaining a planar wave front of beam 11 in FIG. 1. However, this is not essential. Instead, one may generate a converging or diverging beam in a particular manner, using a particular coefficient phase value $(\Delta\phi d_{ref})$ as reference, and controlling mirror 10 for obtaining a focussed (converging or diverging) beam, accordingly.

The control operation has been described in relation to a mirror, namely mirror 10, and being directed toward maintaining a particular contour for that mirror.

This is based on the assumption that the beam 11 has planar wave fronts. This may not be the case. Thus, wave front distortions may be measured separately, and the resulting measuring signals may be superposed upon the control of mirror 10 for the purpose of removing these wave front distortions.

The detector array of FIG. 2c is defined for obtaining a particular task based upon the Zernike decomposition which describes wave front contours that are directly related or translatable to the phenomena called "tilt," "focus," "cylinder," and so forth. In many cases, such a generalized approach may not be needed. For example, the particular circumstances may make it very unlikely that the mirror tilts; but it may warp. In this case, only detectors 32a, 32b, and 32d (FIG. 2b) are needed. In other cases, such curving contour distortions may not arise; but tilting may be likely. This was assumed to be the case in FIG. 2a. In all of these special cases, simplified detector arrays and/or simplified phase detectors and/or simplified phase processing may suffice, whereas additional detectors may be needed to detect, e.g., "coma" or even higher-order distortions.

Figure 3:
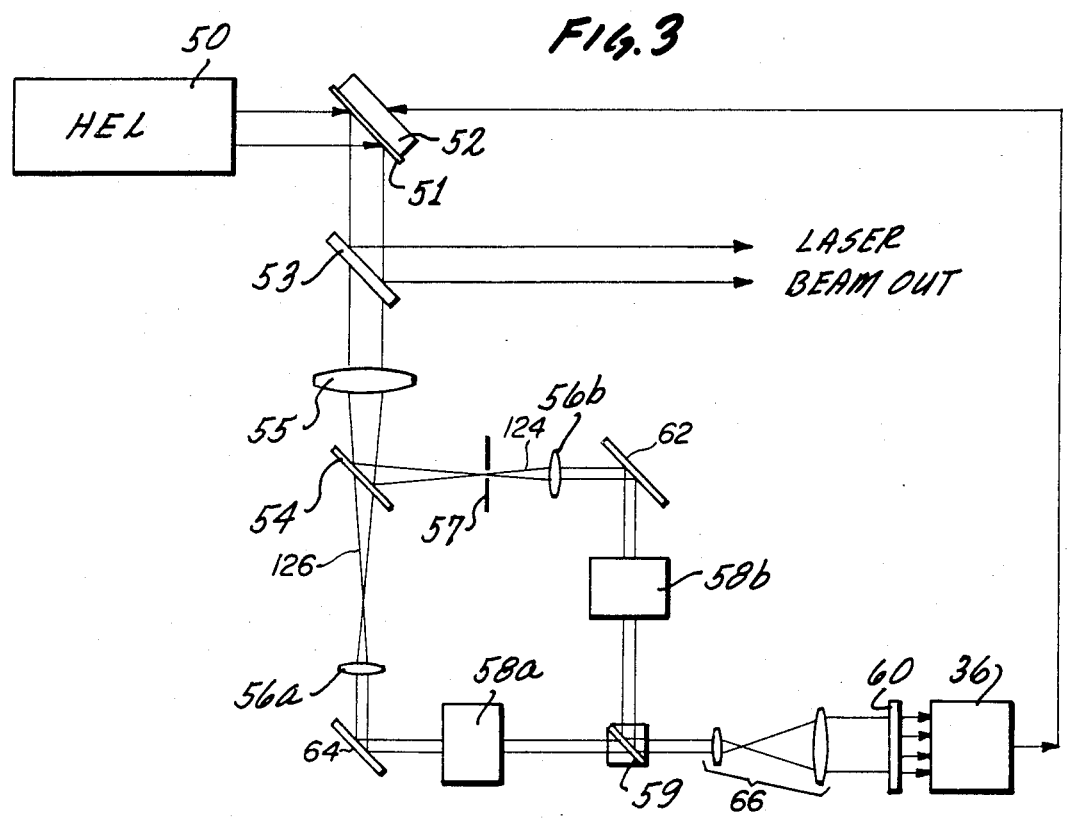
FIG. 3 is a schematic view of a modification of the system shown in FIG. 1.

FIG. 3 illustrates a modified approach and application. Reference numeral 50 refers again to a power or high-energy laser, and reference numeral 51 is a deformable reflector. The mirror 5 is mounted on actuators 52 analogous to actuators 12 in FIG. 1. Another, partially transmissive, redirecting mirror 53 deflects the major portion of the high-energy laser beam, but passes a small portion thereof into the measuring equipment. A beam splitter 54 divides this sampled beam into two, approximately equal, components. Since the cross sections of the beams are quite large, it is advisable to contract them; two-beam contractor optics are provided accordingly. These contractors may share a common lens or lens system 55, placed ahead of beam splitter 54, while short-focal-length lenses 56a and 56b are respectively placed in the individual branches.

The beam contractors each include a focal area, and one contractor includes a diaphragm 57 in the focal area adjacent to lens 56b for limiting the effective size of the focal area to the theoretical size for focussing parallel beams, thereby "cleaning" the beam. All components representing tilt, spherical, and other wave front deformations, are eliminated, resulting in a pencil beam which will serve as a reference beam 124.

The test beam 126 is merely contracted, but lens 56a provides another pencil beam. At least one of the two paths or branches includes a frequency shifter to establish the difference frequency $\Delta f$. It may be practical to include Bragg cells 58a and 58b in both of the beam paths to obtain the difference frequency $\Delta f$ in the two beams as described and these cells 58a and 58b are reached by way of mirror means 62 and 64, respectively. Through optical means 59 (reflectors, and so on), the two beams are combined and will interfere. A beam expander 66 may be provided downstream from the beam-combining element in order to facilitate detection. Detection device 60 is of the same type referred to above (detectors 32) to obtain discrete point detection of intensity variations at the modulation frequency $\Delta f$ and to detect the relative phases as described.

It can, thus, be seen that in this particular example mirror 51 may not produce any unintended wave front distortions; the mirror may distort the wave fronts in a secondary or compounding fashion only. In other words, the wave fronts may already arrive distorted at mirror 51. The main purpose of this apparatus is to ensure, e.g., planar wave fronts of the finally emitted beam, irrespective of the causes of any distortions. The primary function of mirror 51 is to compensate any such distortions; and the feedback control operates toward seeking planar wave fronts (or wave fronts of a particular contour) as they leave mirror 51. Broadly speaking, this example stands in representation of a device and method in which, on the one hand, a laser device includes a controllable device (51) which is capable of modifying wave fronts; shifting them (piston), redirecting them in toto (tilt); causing them to converge, or diverge (focus), remove cylindrical astigmatic abberation in the beam, and so forth. The beam as so provided is monitored or inspected as described with regard to low-order, low-spatial frequency distortions; signals representing the low-order weight coefficient of a Zernike decomposition are generated and fed to the controllable device in order to obtain the desired correction.

The invention is not limited to the embodiments described above; but all changes and modifications thereof, not constituting departures from the spirit and scope of the invention, are intended to be included.

I claim:

1. A wide bandwidth optical modal deformation sensor, comprises:
   a deformable mirror for reflecting a laser beam;
   a plurality of actuators incorporated in said deformable mirror and designed to control surface deformation;
   a detector point electronically connected to each actuator;
   means for directly measuring the optical path difference at each of said detector points, comprising:
   a measuring laser beam capable of being split into two orthogonally polarized components;
   a polarization cube for splitting said measuring laser beam;
   means for generating a frequency difference between said orthogonally polarized components;
   means for recombining said two orthogonally polarized components into a composite beam having two orthogonally polarized components differing by said frequency difference;
   means for directing said composite beam to a polarization interferometer;
   means for expanding and polarization splitting said composite beam into a test beam and a reference beam;
   means for conveying said test beam to said deformable mirror;
   means for conveying said reference beam to a highly planar reference mirror;
   means for returning and recombining said test and reference beams to form a two-component resultant beam;
   means for extracting components of polarization which are polarized in the same direction from said two-component resultant beam such that said extracted components of parallel polarization are caused to interfere with each other and generate a dynamic interference pattern, fringes of which move at the rate of the frequency difference of said test and said reference beam;
   an intercepting plane having a plurality of said detector points located therein for detecting interference pattern and generating an output signal;

an electronic phase detector for measuring phase or optical path difference between each of said detector points and its respective reference point;

means for generating a signal proportional to the optical path difference at each of said detector points; and arithmatic circuits for converting optical path difference signals to modal representations of wave front aberrations and generating output signals indicating the presence and strength of said aberrations; and means for energizing said actuators by conveying said output signals indicating the presence and strength of said aberrations from said arithmatic circuits to said actuators.

2. Apparatus for ensuring planar laser beam wave fronts, comprises:

a deformable mirror for reflecting a laser beam;

a plurality of actuators incorporated in said deformable mirror and designed to control mirror surface deformation;

a detector point electronically connected to each actuator;

means for directly measuring the optical path difference at each of said detector points, comprising:

a partially transmissive redirecting mirror for deflecting a major portion of a laser beam and passing a small portion of said laser beam, the measuring beam, into measuring equipment;

a beam contractor optically aligned with said measuring beam;

a beam splitter for splitting said measuring beam into a reference beam and a test beam;

a diaphragm for cleaning said reference beam;

a first short-focal-length lens optically aligned with said reference beam for creating a reference pencil beam;

a second short-focal-length lens optically aligned with said test beam for creating a test pencil beam;

means for generating a frequency difference between said test and reference pencil beams;

means for recombining said frequency shifted test and reference pencil beams into a composite beam;

means for expanding said composite beam;

means for causing said frequency shifted reference and test pencil beam components of said composite beam to set up an interference pattern;

an intercepting plane having a plurality of said detector points located therein for detecting said interference pattern and generating an output signal;

an electronic phase detector for measuring phase or optical path difference between each of said detector points and its respective reference points;

means for generating a signal proportional to the optical path difference at each of said detector points; and arithmatic circuits for converting optical path difference signals to modal representations of wave front aberrations and generating output signals indicating the presence and strength of said aberrations; and means for energizing said actuators by conveying said output signals indicating the presence and strength of said aberrations from said arithmatic circuits to said actuators.

* * * * *

UNITED STATES PATENT AND TRADEMARK OFFICE
CERTIFICATE OF CORRECTION

PATENT NO. : 4,387,966
DATED : June 14, 1983
INVENTOR(S) : Sandor Holly

It is certified that error appears in the above-identified patent and that said Letters Patent are hereby corrected as shown below:

Abstract, line 7, after "plane" insert --detect--;

Column 8, line 67, before "interference" insert --said--;

Column 10, line 23, delete "points", insert therefor --point--.

Signed and Sealed this

Twenty-seventh Day of December 1983

[SEAL]

Attest:

GERALD J. MOSSINGHOFF

Attesting Officer    Commissioner of Patents and Trademarks